United States Patent [19]

Erckert et al.

[11] Patent Number: 5,430,366
[45] Date of Patent: Jul. 4, 1995

[54] ACTIVE FREE-RUNNING ELEMENT

[75] Inventors: Ricardo Erckert, Assling; Michael Lenz, Zorneding, both of Germany

[73] Assignee: Siemens Aktiengesellschaft, Munich, Germany

[21] Appl. No.: 61,847

[22] Filed: May 14, 1993

[30] Foreign Application Priority Data

May 14, 1992 [DE] Germany .......... 42 15 980.6

[51] Int. Cl.[6] .................................... G05F 1/44
[52] U.S. Cl. ............................ 323/282; 323/271
[58] Field of Search ............ 323/223, 222, 268, 273, 323/274, 282, 283, 224, 225, 271

[56] References Cited

U.S. PATENT DOCUMENTS

| | | | |
|---|---|---|---|
| 3,946,251 | 3/1976 | Kawagoe | 307/237 |
| 4,038,680 | 7/1977 | Yagi et al. | 357/44 |
| 4,392,103 | 7/1983 | O'Sullivan et al. | 323/222 |
| 4,672,303 | 6/1987 | Newton | 323/285 |
| 4,882,532 | 11/1989 | Gariboldi et al. | 323/222 |
| 5,045,770 | 9/1991 | Brooks | 323/223 |

FOREIGN PATENT DOCUMENTS

| | | |
|---|---|---|
| 0380881 | 8/1990 | European Pat. Off. . |
| 482241 | 4/1992 | European Pat. Off. . |
| 2839190 | 11/1979 | Germany . |
| 3203987 | 10/1983 | Germany . |
| 3910526 | 10/1990 | Germany . |

OTHER PUBLICATIONS

Publication: Halbleiter-Schaltungstechnik (Tietze & Schenk) 9th Ed., 1991, Chapter 18.6 pp. 563-571.

*Primary Examiner*—Thomas M. Dougherty
*Assistant Examiner*—Shawn Riley
*Attorney, Agent, or Firm*—Herbert L. Lerner; Laurence A. Greenberg

[57] ABSTRACT

A switching regulator includes an inductive load. A monolithically integrated active free-running element includes an npn transistor switching the inductive load to generate a free-running current carried by the transistor. The transistor has a base terminal and collector and emitter terminals defining a collector-to-emitter voltage. A drive circuit has an output terminal connected to the base terminal of the transistor to trigger the transistor for operating the transistor largely into the saturation range, whenever the collector-to-emitter voltage of the transistor is positive.

6 Claims, 1 Drawing Sheet

ACTIVE FREE-RUNNING ELEMENT

BACKGROUND OF THE INVENTION

Field of the Invention

The invention relates to a monolithically integrated active free-running element for use in a current switch device with inductive loading, of the kind that can be used in secondary switching regulators. In particular, it relates to a largely monolithically integratable current switch device for such a switching regulator.

As described in a book entitled "Halbleiterschaltungstechnik" [Semiconductor Circuitry], by Tietze and Schenk, 9th Edition, 1991, Chapter 18.6, "Sekundärgetaktete Schaltregler" [Secondary Switching Regulators], pp. 563 ff., and in particular Chapter 18.6.1, pp. 563–566, depending on their structure, secondary switching regulators include a current switch which, upon being controlled, typically by a closed and open-loop control circuit whenever the current switch periodically switches, switch an inductance either between the input voltage and the reference potential, or between the output voltage and the reference potential, or between the input voltage and the output voltage. So far, such current switches have been achieved by means of an electronic power switch and a so-called recovery or free-running diode. Either a thyristor or a bipolar or field-effect transistor is provided in such a case as a power switch. In that case, however, the efficiency of switched-mode power supplies depends on the forward voltage drop of the recovery diode. Particularly in switched-mode power supplies with significant step-down voltage conversion, that is so-called step-down converters, the efficiency of the switched-mode power supply depends very strongly on the forward voltage drop of a recovery diode. In switched-mode power supplies with a low output voltage, such as 5 V for logic power supplies, that influence is especially pronounced. Previously, the efficiency of such switched-mode power supplies could be improved only by using Schottky diodes, which are known to have a forward voltage drop of approximately 0.4 V, in contrast to the usual silicon diodes having a forward voltage drop of approximately 0.65 to 0.8 V. However, the integration of Schottky diodes requires a great amount of surface area and therefore is expensive, and provision is not made for such integration in all semiconductor technologies. Such switched-mode power supplies therefore require not only the power switch as a discrete component, but the recovery diode as well.

It is accordingly an object of the invention to provide a monolithically integratable free-running element, which overcomes the hereinafore-mentioned disadvantages of the heretofore-known devices of this general type and which has a low forward voltage.

SUMMARY OF THE INVENTION

With the foregoing and other objects in view there is provided, in accordance with the invention, a switching regulator, comprising an inductive load; a monolithically integrated active free-running element including an npn transistor switching the inductive load to generate a free-running current carried by the transistor, the transistor having a base terminal and having a collector terminal and an emitter terminal defining a collector-to-emitter voltage; and a drive circuit having an output terminal connected to the base terminal of the transistor to trigger the transistor for operating the transistor largely into the saturation range, whenever the collector-to-emitter voltage of the transistor is positive.

In accordance with another feature of the invention, the drive circuit drives the transistor into conduction as a function of an amount of voltage equal to the positive collector-to-emitter voltage of the transistor.

In accordance with a further feature of the invention, there is provided a power switch having on and off states, the control of the free-running element being effected during reverse cycle with control of the power switch, and the free-running element being conducting only whenever the power switch is in the off state.

In accordance with an added feature of the invention, there is provided a recovery diode connected parallel to the free-running element.

In accordance with a concomitant feature of the invention, the switching regulator is a step-down regulator having an output voltage, and a supply voltage for the drive circuit is drawn from the output voltage.

The invention accordingly proposes a free-running element including an npn transistor, having an emitter terminal which is wired like the cathode terminal of a replaced recovery diode and having a collector terminal which is wired like the anode terminal of the recovery diode. The base terminal of the transistor is triggered as a function of the voltage at the emitter of the transistor. The voltage at the emitter of the transistor is monitored to that end. If it drops below 0 V, the transistor is triggered, so that it functions like a recovery diode. The transistor should be operated as close to saturation as possible, and optionally even within the saturation range. As a result, the forward voltage drop across the transistor can be reduced as a function of the collector current to a value of from 0.1 to 0.5 V. The forward voltage through a typical diode would be between 0.6 and 0.9 V, at the same current value.

Care must be taken to ensure that the transistor being used, which replaces the recovery diode, has an adequately high base-to-emitter reverse voltage, so that when the power switch is made conducting, it does not break down as a result of the input voltage being applied. Suitable transistors are described in U.S. Pat. No. 4,038,680, German Published, Non-Prosecuted Application DE 39 10 526 A1, and Published European Application No. 0 482 241 A1.

In the monolithic integration of a transistor configuration according to the invention for replacement of a recovery diode, which typically includes an npn transistor as described above and a drive circuit, in order to reduce triggering losses, the driver configuration should suitably draw its supply voltage from the already-reduced (secondary) voltage, when used in a step-down regulator circuit.

In an advantageous embodiment of the invention, the npn transistor is made conducting by a drive circuit as a function of the amount of a negative emitter-to-collector voltage or a positive collector-to-emitter voltage of the transistor, and a result the power loss caused by the current is limited, even though the transistor is triggered at least nearly into saturation.

Other features which are considered as characteristic for the invention are set forth in the appended claims.

Although the invention is illustrated and described herein as embodied in an active free-running element, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENT

A trigger circuit for a power switch for this kind of switching regulator is known to those skilled in the art, and therefore is not shown in detail, for the sake of simplicity.

Figure 1:
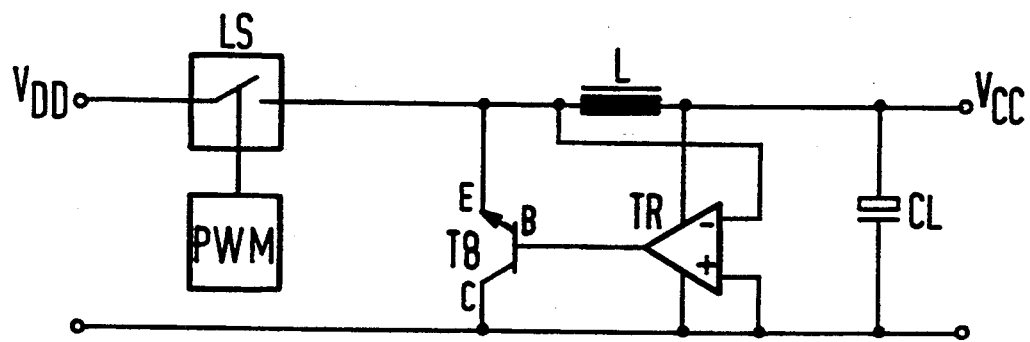
FIG. 1 is a schematic and block circuit diagram showing an overview of an exemplary embodiment of a step-down regulator, using a circuit configuration according to the invention.

Referring now to the figures of the drawing in detail and first, particularly, to FIG. 1 thereof, there is seen an electronic power switch LS, which is triggered in a known manner by a pulse width modulator PWM. An input terminal of the electronic power switch LS is connected to a potential $V_{DD}$ of an input voltage that is related to a reference potential, which is ground. An output terminal of the electronic power switch LS is connected with one terminal of an inductance (choke) L. Another terminal of this inductance L is connected to an output terminal that outputs an output potential $V_{CC}$ of the switching regulator shown. The output terminal having the potential $V_{CC}$ is connected to the reference potential, which is ground, through a capacitor CL. The output terminal having the potential $V_{CC}$ is also connected to a supply voltage terminal of a drive circuit TR. The other supply voltage terminal of this drive circuit TR is connected to the reference potential, ground. The drive circuit TR has one inverting and one non-inverting input and an output terminal. The output terminal of the drive circuit is connected with a base terminal B of a transistor T8. An emitter terminal E of this transistor T8 and the inverting input of the drive circuit TR are connected to a node between the power switch LS and the inductance L. A collector terminal C of the transistor T8 is connected to the reference potential, ground. A step-down regulator configuration that is known in principle is shown, but with the recovery diode, which is provided in known configurations, in this case being replaced by the transistor T8 and the drive circuit TR that triggers it. The transistor T8 is constructed as an npn transistor, and the voltage at the emitter terminal E of this transistor T8 is referenced by the drive circuit TR with respect to the reference potential, ground. As soon as the voltage at the emitter of the transistor T8 drops below 0 V, the transistor is turned on at its base terminal B by the drive circuit TR. In this respect, care must be taken to ensure that the drive circuit TR advantageously feeds a suitably high base current into the base terminal of the transistor T8, so that this transistor will be operated in the saturation range as a function of the current amplification of the transistor T8.

Figure 2:
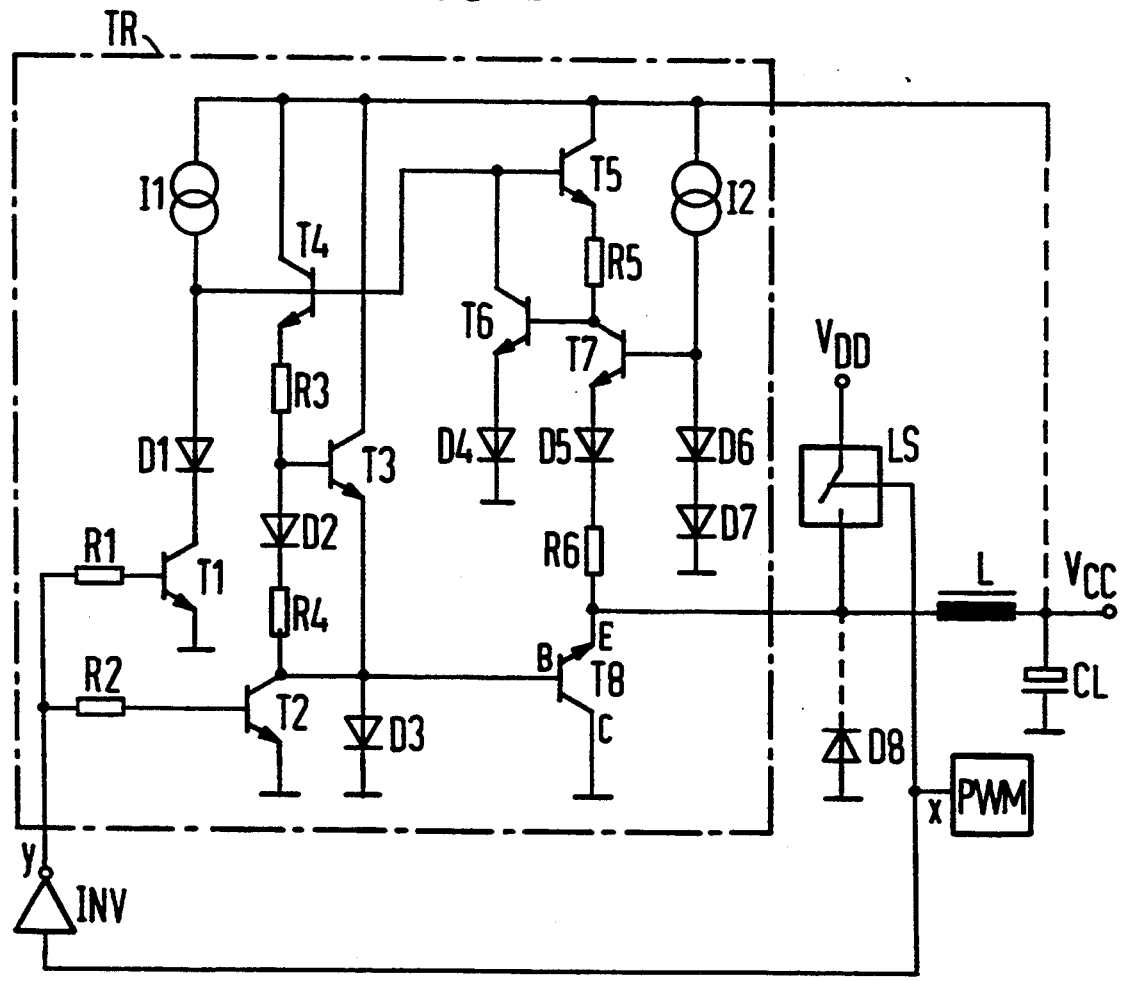
FIG. 2 is a schematic and block circuit diagram of an especially advantageous embodiment of a configuration according to FIG. 1.

FIG. 2 shows an especially advantageous embodiment of a circuit configuration of FIG. 1. Circuit elements having the same functions have the same reference numerals in both figures. FIG. 2 shows a power switch LS, which is capable of switching an input potential $V_{DD}$ to a circuit node that is in turn connected through an inductance L to an output terminal, which furnishes an output potential $V_{CC}$. This circuit node is also connected to the emitter terminal E of a transistor T8 and to one terminal of a resistor R6. A connection of an cathode terminal of a diode D8 to this circuit node is shown in broken lines. The diode D8 has a anode terminal which is connected to the reference potential, ground. The collector terminal C of the npn transistor T8 is connected to reference potential, ground. The base terminal B of the transistor T8 is connected to the anode terminal of a diode D3, which has an cathode terminal that is connected with the reference potential, ground. Moreover, the base terminal B of the transistor T8 is connected to an emitter terminal of a transistor T3, to a collector terminal of a transistor T2, and to one terminal of a resistor R4. A collector terminal of the transistor T3 is acted upon by a supply potential, as is suggested by a broken line that is shown as leading to the output terminal of the switching regulator. A base terminal of the transistor T3 is connected to an anode terminal of a diode D2, which has a cathode terminal that is connected to another terminal of the aforementioned resistor R4. Moreover, the base terminal of the transistor T3 is connected to one terminal of a resistor R3, which has another terminal that is connected with an emitter terminal of a transistor T4. A collector terminal of this transistor T4 is acted upon by the same supply potential as the collector terminal of the transistor T3. A current input of a current source I1 is likewise connected to this supply potential. A current output of this current source I1 is connected to a base terminal of the transistor T4, to a base terminal of a transistor T5, to a collector terminal of a transistor T6, as well as to an anode terminal of a diode D1. A cathode terminal of this diode D1 is connected to a collector terminal of a transistor T1, which has an emitter terminal that is connected to reference potential, ground. A base terminal of the transistor T1 is connected through a resistor R1 to a control node y. This control node y is connected through a further resistor R2 to a base terminal of the transistor T2. The control node y is connected with an output of an inverter INV, which has an input that is connected to a control terminal x. The control terminal x is also connected to the control input of the power switch LS and is controlled by a pulse width modulator circuit PWM. A collector terminal of the transistor T5 is acted upon by the same supply potential as the collector terminal of the transistor T4. An emitter terminal of the transistor T5 is connected through a resistor R5 both to a base terminal of the transistor T6 and to a collector terminal of a transistor T7. An emitter terminal of the transistor T6 is connected to an anode terminal of a diode D4, which has a cathode terminal that is connected to reference potential, ground. A base terminal of the transistor T7 is connected to a current output of a current source I2 and is also connected with an anode terminal of a diode D6, which has a cathode terminal that is connected to an anode terminal of a diode D7. A cathode terminal of the diode D7 is connected to reference potential, ground. A current input of the current source I2 is acted upon by the same supply potential as the collector terminals of the transistors T3, T4 and T5. An emitter terminal of the transistor T7 is connected to an anode terminal of a diode D5, which has a cathode terminal that is connected through the aforementioned resistor R6 to the emitter terminal E of the transistor T8. In integrated semiconductor circuits, the diodes shown are typically constructed as suitably connected transistors.

In an advantageous embodiment of the circuit shown in FIG. 2, the currents of the current sources I1 and I2 are each 50 A. The following values have proved advantageous for the resistances of the resistors: $R1=20$ k$\Omega$, $R2=6$ k$\Omega$, $R3=200$ $\Omega$, $R4=100$ $\Omega$, $R5=3$ k$\Omega$, and $R6=7$ k$\Omega$.

The transistor T7, together with the diodes D5, D6 and D7, form a differential amplifier configuration. The transistor T6 is intended as a regulating transistor, while the transistor T3 is intended as a current amplifier. The transistors T1 and T2 are intended as turn-off switches. The circuit including the transistors T4, T5 and T6 in combination with the resistors R3 and R5 effects a voltage transformation, wherein a voltage drop across the resistor R3 is proportional to the voltage drop across the resistor R5.

If $U_{BE}$ is the typical base-to-emitter voltage of any bipolar transistor in the circuit of FIG. 2, and $U_{Sat}$ is the typical saturation voltage, then in the drive circuit of FIG. 2, whenever the transistor T8 is blocked, the following voltage conditions are present: A voltage of 2 $U_{BE}$ is present at the base terminal of the transistor T6 and at the collector terminal of the transistor T7; 3 $U_{BE}$ is present at the base terminals of the transistors T4 and T5 and at the collector terminal of the transistor T6. A voltage drop of $U_{BE}-U_{Sat}$ is present across the resistor R3. The collector-to-emitter voltage of the transistor T2 is $U_{Sat}$ (approximately 0.1 V), and the collector current of the transistor T4 is obtained from the difference between a base-to-emitter voltage $U_{BE}$ and a saturation voltage $U_{Sat}$, divided by the resistance of the resistor R3.

The circuit portion including the resistor R1, the transistor T1 and the diode D1 serves as an additional turn-off switch and prevents a reverse current through the transistor T4. If the driver configuration is supplied with the reduced output voltage of the switched-mode power supply, then it is recommended that the diode D8 be provided parallel to the collector-to-emitter path of the transistor T8. If in fact relatively high free-running currents must be carried, then a reverse-voltage-proof transistor configuration, of the kind that must be used as the transistor T8, becomes very costly in terms of surface area in integrated circuitry. The parallel connection of a suitable diode D8 permits a considerable reduction in the surface area of the transistor T8, with an equally effective circuit configuration. Moreover, in the event that the drive circuit is fed from the secondary side of a step-down regulator, the startup of this switched-mode power supply is also effected by means of this diode D8. In that case, the slight voltage drop of the free-running element does not become effective until the drive circuit can be supplied from the output side of the switched-mode power supply.

We claim:

1. A switching regulator, comprising:
   an inductive load;
   a switching element connected to said inductive load and forming a current path together with said inductive load;
   a supply potential terminal connected to said current path for conducting a current through said supply potential terminal, said switching element, and said inductive load when said switching element is in a conductive state;
   a capacitor connected to said inductive load and providing an output voltage;
   a monolithically integrated active free-running element connected to said inductive load for conducting a current through said free-running element, said inductive load and said capacitor when said switching element is in a blocking state, said free-running element including an npn transistor switching said inductive load to generate a free-running current carried by said transistor, said transistor having a base terminal and having a collector terminal and an emitter terminal defining a collector-to-emitter voltage; and
   a drive circuit having an output terminal connected to the base terminal of said transistor to trigger said transistor for operating said transistor largely into the saturation range, whenever the collector-to-emitter voltage of said transistor is positive.

2. A switching regulator, comprising:
   an inductive load;
   a switching element connected to said inductive load for forming a current path with at least two terminals when the switching element is conductive;
   a supply potential terminal connected at one of said at least two terminals of said current path, such that a current flows through said supply potential terminal, said switching element, and said inductive load when the switching element is conductive;
   a capacitor connected to said inductive load, said capacitor providing an output voltage;
   a monolithically integrated active free-running element connected to said inductive load such that a current flows through said free-running element, said inductive load, and said capacitor when the switching element is not conductive;
   a driver circuit having an output connected to said free-running element for driving said free-running element;
   said free-running element comprising an npn-transistor having a base, an emitter and a collector, said collector and said emitter defining a collector-to-emitter voltage; said output of said driver circuit being connected to said base of said npn-transistor of said free-running element, and said driver circuit driving said npn-transistor of said free-running element such that said npn-transistor is operated substantially in a saturation range when said collector-to-emitter voltage is positive.

3. The switching regulator according to claim 2, wherein said drive circuit drives said transistor into conduction as a function of an amount of voltage equal to the positive collector-to-emitter voltage of said transistor.

4. The switching regulator according to claim 2, wherein said switching element is driven in reverse cycle relative to said free-running element, such that said free-running element can only conduct when said switching element is in an OFF state.

5. The switching regulator according to claim 2, wherein the switching regulator is a step-down regulator having an output voltage, and a supply voltage for said drive circuit is drawn from the output voltage.

6. The switching regulator according to claim 4, including a recovery diode connected parallel to said free-running element.

* * * * *